United States Patent
Donald et al.

(10) Patent No.: US 12,339,643 B2
(45) Date of Patent: Jun. 24, 2025

(54) METHOD AND SYSTEM FOR AUTOMATING 3D TO 2D CUSTOM FIT PATTERN MAKING

(71) Applicant: Tri-D Technologies Inc., Toronto (CA)

(72) Inventors: Eaton Donald, Toronto (CA); Luke Niwranski, Sudbury (CA); Mark Jewell, Sudbury (CA)

(73) Assignee: Tri-D Technologies Inc., Toronto (CA)

( * ) Notice: Subject to any disclaimer, the term of this patent is extended or adjusted under 35 U.S.C. 154(b) by 0 days.

(21) Appl. No.: 18/288,946

(22) PCT Filed: Apr. 13, 2022

(86) PCT No.: PCT/CA2022/050573
§ 371 (c)(1),
(2) Date: Oct. 30, 2023

(87) PCT Pub. No.: WO2022/226629
PCT Pub. Date: Nov. 3, 2022

(65) Prior Publication Data
US 2024/0201653 A1    Jun. 20, 2024

Related U.S. Application Data

(60) Provisional application No. 63/182,487, filed on Apr. 30, 2021.

(51) Int. Cl.
*A41H 3/04*    (2006.01)
*G05B 19/4097*    (2006.01)

(52) U.S. Cl.
CPC ............ *G05B 19/4097* (2013.01); *G05B 2219/45196* (2013.01)

(58) Field of Classification Search
CPC . A41H 3/007; A41H 3/04; G05B 2219/45196
See application file for complete search history.

(56) References Cited

U.S. PATENT DOCUMENTS

| | | | |
|---|---|---|---|
| 6,968,075 B1 | 11/2005 | Chang | |
| 2004/0049309 A1* | 3/2004 | Gardner | A41H 1/00 700/132 |

(Continued)

FOREIGN PATENT DOCUMENTS

| | | |
|---|---|---|
| CN | 1419681 A | 5/2003 |
| CN | 108634459 B1 | 4/2020 |
| KR | 102244129 B1 | 4/2021 |

OTHER PUBLICATIONS

Tri D Technologies Inc. d/b/a Exactflat Software, "ExactFlat Scan to Pattern: How to make compression sleeves, prosthetics and custom fit medical wearables", YouTube, Mar. 21, 2021, XP093237833, retrieved from https://www.youtube.com/watch?v=uoPgB4EaSuo. 2 page bibliographic extract submitted.

(Continued)

*Primary Examiner* — Nathan E Durham
(74) *Attorney, Agent, or Firm* — Brion Raffoul

(57) ABSTRACT

Systems and methods for automated patternmaking. To create patterns for use in manufacturing a desired piece of clothing, body measurements, style, and fit are entered and a suitable 3D model of the piece of clothing is generated based on those body measurements, style and fit. Once finalized, the surface of the 3D model is converted into multiple 2D models, each 2D model corresponding to an expected pattern for the piece of clothing. These 2D models are then finalized by being adjusted for manufacturing needs. The resulting patterns from the 2D models are then used as the required patterns for manufacturing the piece of clothing. The process may be used in other types of manufacturing that requires patterns to be generated.

19 Claims, 12 Drawing Sheets

(56) References Cited

U.S. PATENT DOCUMENTS

| | | | |
|---|---|---|---|
| 2007/0244670 A1 | 10/2007 | Sakaguchi et al. | |
| 2009/0222127 A1* | 9/2009 | Lind | G06Q 30/0601 |
| | | | 705/26.1 |
| 2019/0008226 A1 | 1/2019 | Krivonosova | |
| 2019/0231012 A1 | 8/2019 | Daczewitz et al. | |

OTHER PUBLICATIONS

Guan et al., "DRAPE: DRessing Any PEreson", ACM Transactions on Graphics, vol. 31, No. 4, Jul. 1, 2012, pp. 1-10, XP055195040, ISSN: 0730-0301, DOI: 10.1145/2185520.2185531.
Extended European Search Report for European App. No. 22794129.1, mailed Jan. 22, 2025. 13 pages.

* cited by examiner

METHOD AND SYSTEM FOR AUTOMATING 3D TO 2D CUSTOM FIT PATTERN MAKING

RELATED APPLICATIONS

This application is a 35 U.S.C. 371 national stage filing and claims priority to International Application No. PCT/CA2022/050573 filed on Apr. 13, 2022, entitled METHOD AND SYSTEM FOR AUTOMATING 3D TO 2D CUSTOM FIT PATTERN MAKING which claims the benefit of U.S. Provisional Application No. 63/182,487 filed on Apr. 30, 2021, each of which are incorporated herein by reference in their entirety.

TECHNICAL FIELD

The present invention relates to systems and methods for pattern making. More specifically, the present invention relates to systems and methods that produce patterns useful for manufacturing items. In one embodiment, these items are items of clothing based on specific body measurements.

BACKGROUND

The digital revolution of the past 50 years has produced innumerable advances as automation and digitization accelerates not just development time but also implementation time when it comes to everything from design to manufacturing. However, one field which has not benefited much from such developments is the traditional custom-made clothing.

Traditionally, a custom-made garment is created by first taking measurements for relevant body parts of the user who will wear the garment. Thus, for a pair of pants, various leg and waist measurements are taken and a skilled patternmaker creates a pattern which will be used to cut the fabric. The cut fabric will then be assembled to form the end product, a custom-made garment.

As should be well-known, creating the pattern to be used in cutting the sections of fabric may take days, weeks, or even months as repeated adjustments may need to be made to the patterns to ensure a proper fit to the end user. Experienced tailors, when taking the end user's measurements, already know to make at least some allowances in the measurements to ensure at least a modicum of ease of movement when wearing the resulting garment. Similarly, experiences patternmakers know to provide allowances in the resulting patterns for garment necessities such as seams and stitches.

Some efforts have been made to automate the pattern making process but these efforts have, by and large, directly reflected the traditional methods. Patterns are created digitally and a garment is made using the patterns. The resulting garment is then worn and tested for suitability. Or, in large volume manufacturing runs, test garments are made from patterns and these test garments are worn to test for fit and suitability. If the test garments pass the tests, the patterns used are then used to cut fabric that will then be assembled into complete garments. As well, the patterns are scaled up or down to account for larger or smaller sizes. As can be imagined, the scaled up or down patterns do not produce suitable garments as the scaling only allows for linear adjustments in the measurements.

This, unfortunately, has a number of drawbacks and is unsuitable for one-off, customized, clothing manufacturer. Currently, users who desire clothing that fits exactly to their own specific body measurements require skilled tailors and skilled patternmakers to measure the user, create the suitable patterns, cut the patterns from fabric, and assemble the final garment. This can take weeks if not months and may require frequent visits for fittings and adjustments.

There is therefore a need for systems and methods that not only automate the process but takes into account all the features and necessities for considerations such as fit, finish, style, and ease of movement. Preferably, such systems and methods would not require any human intervention once the process has begun. More preferably, such systems and methods can be applied to other fields of manufacture.

SUMMARY

The present invention provides systems and methods for automated patternmaking. To create patterns for use in manufacturing a desired piece of clothing, body measurements, style, and fit are entered and a suitable 3D model of the piece of clothing is generated based on those body measurements, style and fit. Once finalized, the surface of the 3D model is converted into multiple 2D models, each 2D model corresponding to an expected pattern for the piece of clothing. These 2D models are then finalized by being adjusted for manufacturing needs. The resulting patterns from the 2D models are then used as the required patterns for manufacturing the piece of clothing. The process may be used in other types of manufacturing that requires patterns to be generated.

In a first aspect, the present invention provides a method for generating 2D patterns for use in manufacturing, the method comprising:
  generating a 3D model of an item of interest based on desired measurements of said item of interest and on at least a style, said 3D model being generated to account for characteristics of a material to be used for said item of interest;
  generating said 2D patterns from specific sections of said 3D model;
  wherein said method is fully automated.

In a second aspect, the present invention provides a method for generating 2D patterns for use in clothing manufacturing, the method comprising:
  a) receiving body measurements of a specific person, said specific body measurements being specific to a piece of clothing of interest;
  b) receiving a desired style for said piece of clothing of interest
  c) generating a 3D model for said piece of clothing, said 3D model being generated based on said measurements received in step a) and on said desired style received in step b);
  d) converting said 3D model into separate 2D models, each 2D model corresponding to a section of said 3D model and to a pattern for use in manufacturing said piece of clothing;
  e) adjusting each of said 2D models to account for manufacturing needs;
  f) finalizing each of said 2D models to result in 2D patterns suitable for clothing manufacture of said piece of clothing.

In a third aspect, the present invention provides a method for generating 2D patterns for use in manufacturing, the method comprising:
  a) receiving item measurements relating to an item of manufacture that is of interest;

b) generating a 3D model for said item of manufacture, said 3D model being based on said item measurements received in step a);

c) converting said 3D model into separate 2D models, each 2D model corresponding to a section of said 3D model and to a pattern for use in manufacturing said item;

d) adjusting each of said 2D models to account for manufacturing needs;

e) finalizing each of said 2D models to result in 2D patterns suitable for manufacturing of said item.

In a fourth aspect, the present invention provides a system for generating 2D patterns for use in manufacturing, the system comprising:

a 3D model generation module for generating a 3D model of an item of manufacture, said 3D model being based on user provided measurements;

a conversion module for converting surfaces of said 3D model into at least one 2D model;

a 2D model adjustment module for adjusting each of said at least one 2D model into a pattern suitable for manufacturing said item of manufacture.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
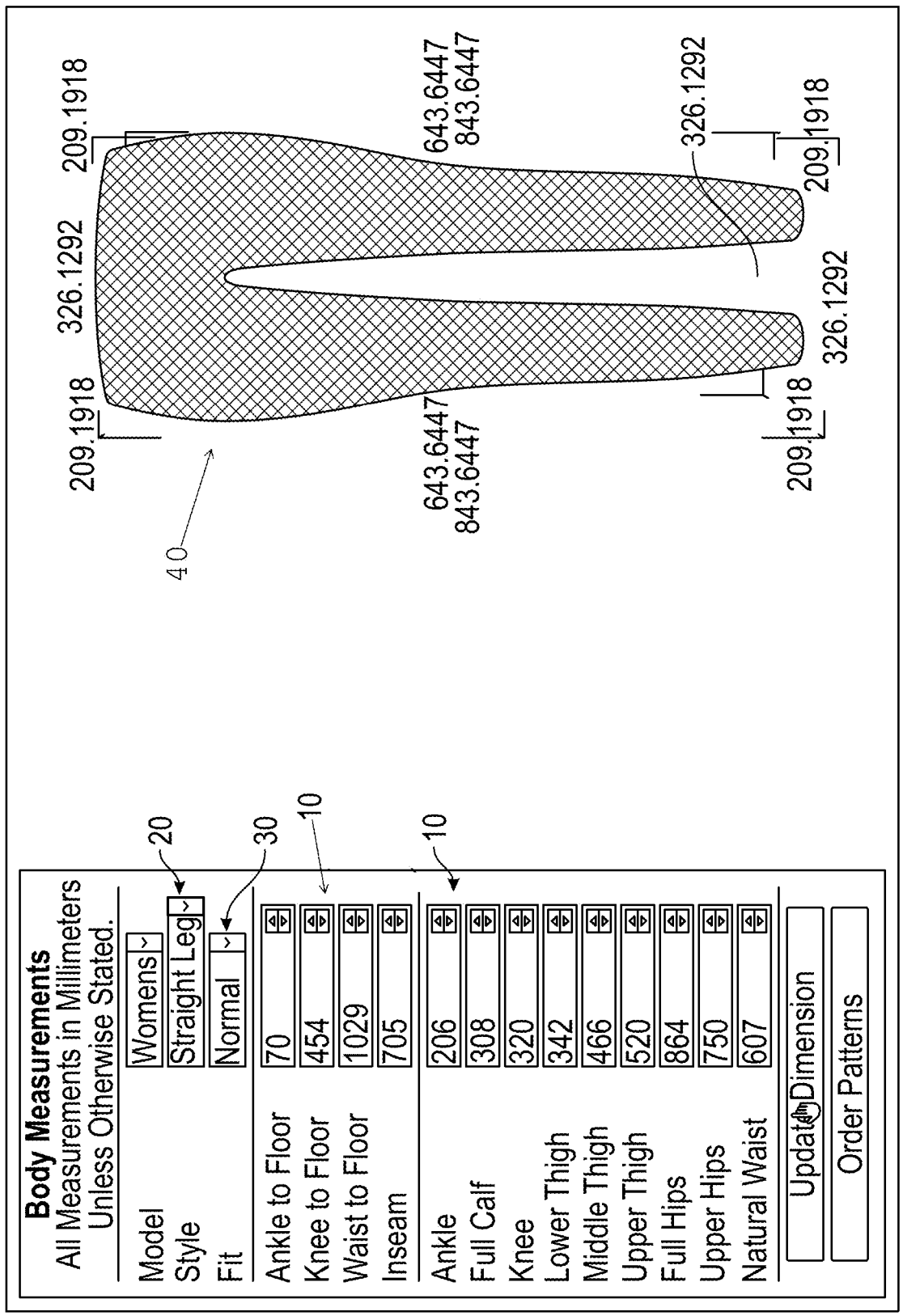
FIG. 1 is a screenshot of a user interface of a system according to one aspect of the present invention.

In one aspect, the present invention provides systems and methods relating to generating 2D models for use in manufacturing items of interest. The present invention can be used in generating 2D models to be used in cutting material or fabric, either to coat an item or to produce the item itself. As an example, the 2D model can be used as the pattern for cutting metal or plastic material that can be assembled to form a 3D item. Similarly, the 2D model can be used as the pattern to produce panels of fabric to be assembled as custom fit clothing. It should be clear that, although the example provided below is focused on clothing and on custom fit clothing, the system and method of the present invention can be applied in many fields. As noted above, the system and method can be used to generate 2D models that can serve as patterns for use as coverings on 3D items or for use as panels to be assembled into a 3D item.

As noted above, clothing that is made to fit well can be difficult to find. One aspect of the present invention addresses this by providing an easy-to-use system and method produces 2D patterns that can be used to manufacture made-to-fit clothing specific to a specific person's measurements as well as to that specific person's desired fit and style. The present invention allows for each characteristic of the end result garment to be controllable by adjusting at least one parameter of a 3D model of the garment. By controlling and adjusting the parameters of the 3D model of the garment as the 3D model is being generated, the system can control how the end garment will fit. Thus, creating a 3D model of the garment that mimics the end garment allows for control of how the garment will function without the need to create/implement the garment.

In use, the present invention receives a specific person's body measurements as well as the desired style and fit of the desired piece of clothing. A 3D model of the piece of clothing of interest is then generated based on those body measurements as well as on the selected style and fit. The 3D model, when generated, can be preconfigured to take into account options such as pockets, button placements, labels, etc. Once the 3D model has been finalized, 2D models are then generated from the various sections of the 3D model surface. These 2D models, preferably, correspond to panels or patterns that can be used to manufacture the piece of clothing. When the various 2D models of the sections have been generated, the 2D models are then adjusted to account for manufacturing needs. This means that the dimensions of the 2D models may be adjusted to provide material allowances for seams, stitches, stitching patterns, etc. Once finalized, the various 2D models can be forwarded to manufacturers to use as direct patterns to be cut from fabric and assembled as a custom fit piece of clothing for the person whose body measurements were used.

It should be clear that the process outlined above is completely automated and does not require any human intervention. A human may be required to determine the body measurements and to enter these measurements into the system. However, once the measurements have been entered and the type of clothing, desired fit, desired style and other options have been entered, the system is automated. Once all the desired data has been entered, the system produces patterns to be used directly in the manufacturing of the piece of clothing.

It should also be clear that the system and method of the present invention takes into account the material to be used in the piece of clothing when creating the 3D model. Because of this, the system takes into account the characteristics of the fabric (such as stretchability) when creating the patterns. The resulting 3D model takes into consideration how a material or fabric stretches or "hangs" when worn as clothing and adjusts the 2D model accordingly. This ensures that the resulting piece of clothing, when cut and assembled from the patterns produced by the present invention, fits properly on the user.

Referring to FIG. 1, a screenshot of a user interface used in one implementation of the invention is illustrated. In this implementation, the piece of clothing is a pair of pants or a pair of jeans. In the user interface, one can see a number of areas 10 where specific body measurements are entered. A section 20 allows a user to enter a style of pants while yet a third section 30 allows the user to enter a fit for the pants. A resulting 3D model 40 is shown at the right of the user interface. For clarity, the measurements for a pair of pants may include the following:

WAIST AT THE BELT LINE
UPPER HIP
FULL HIP
UPPER THIGH

MIDDLE THIGH
LOWER THIGH
KNEE
CALF
ANKLE
WAIST AT THE BELT LINE TO FLOOR
CROTCH TO FLOOR
KNEE TO FLOOR
FRONT RISE
TOTAL RISE

Figure 2A:
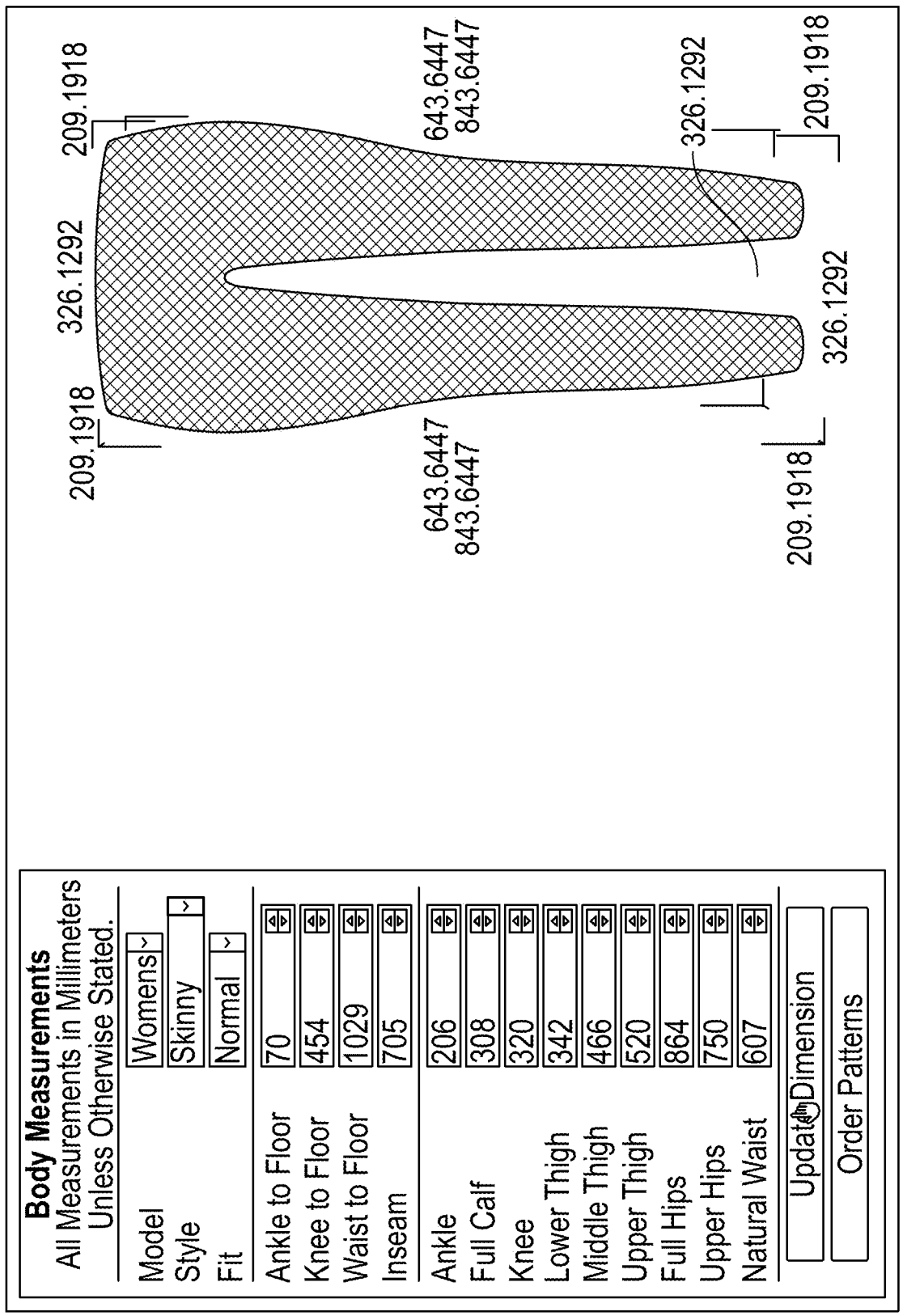
FIGS. 2A-2D illustrate various 3D models of different styles of a pair of jeans using the same body measurements.
Figure 2B:
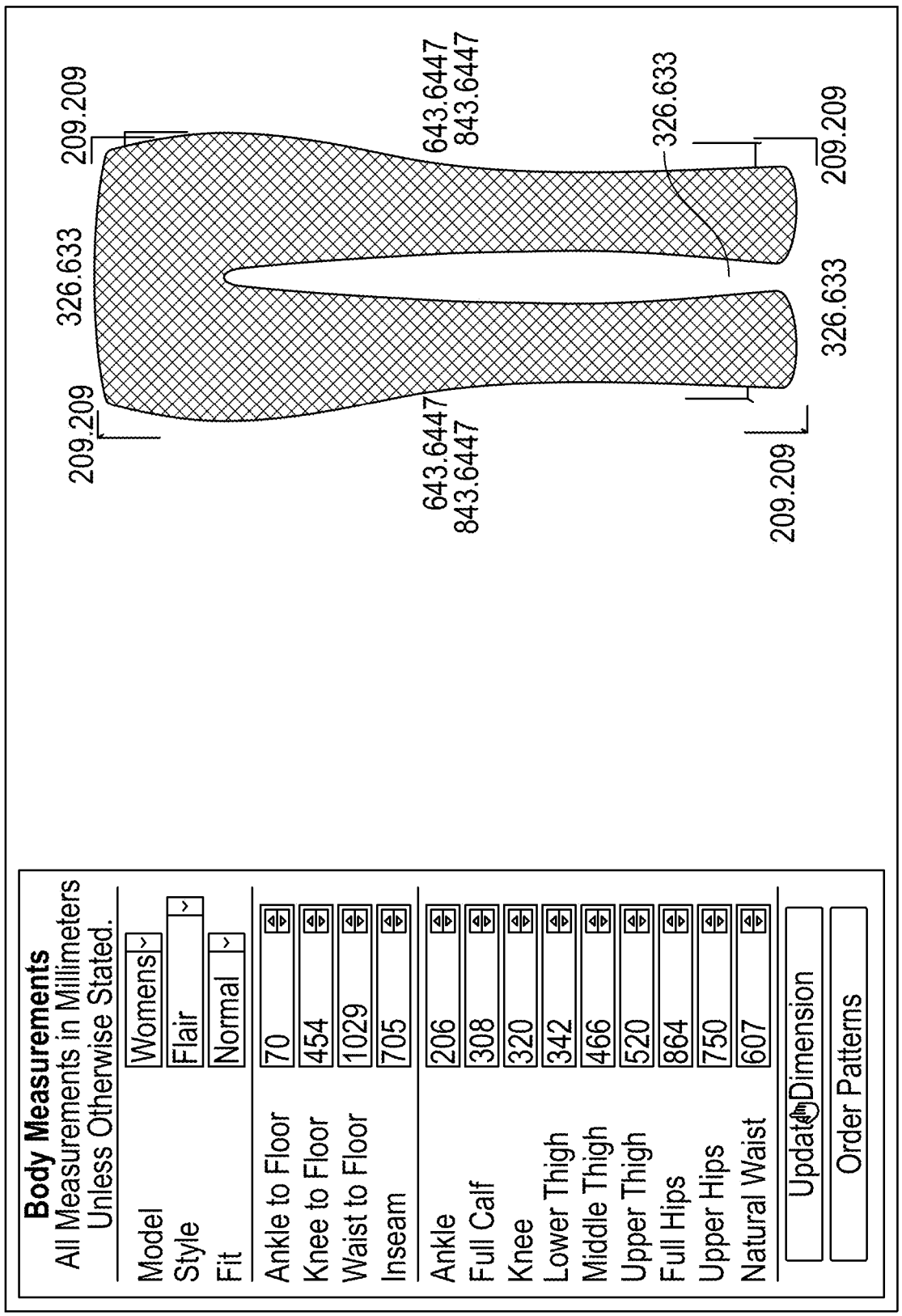
Figure 2C:
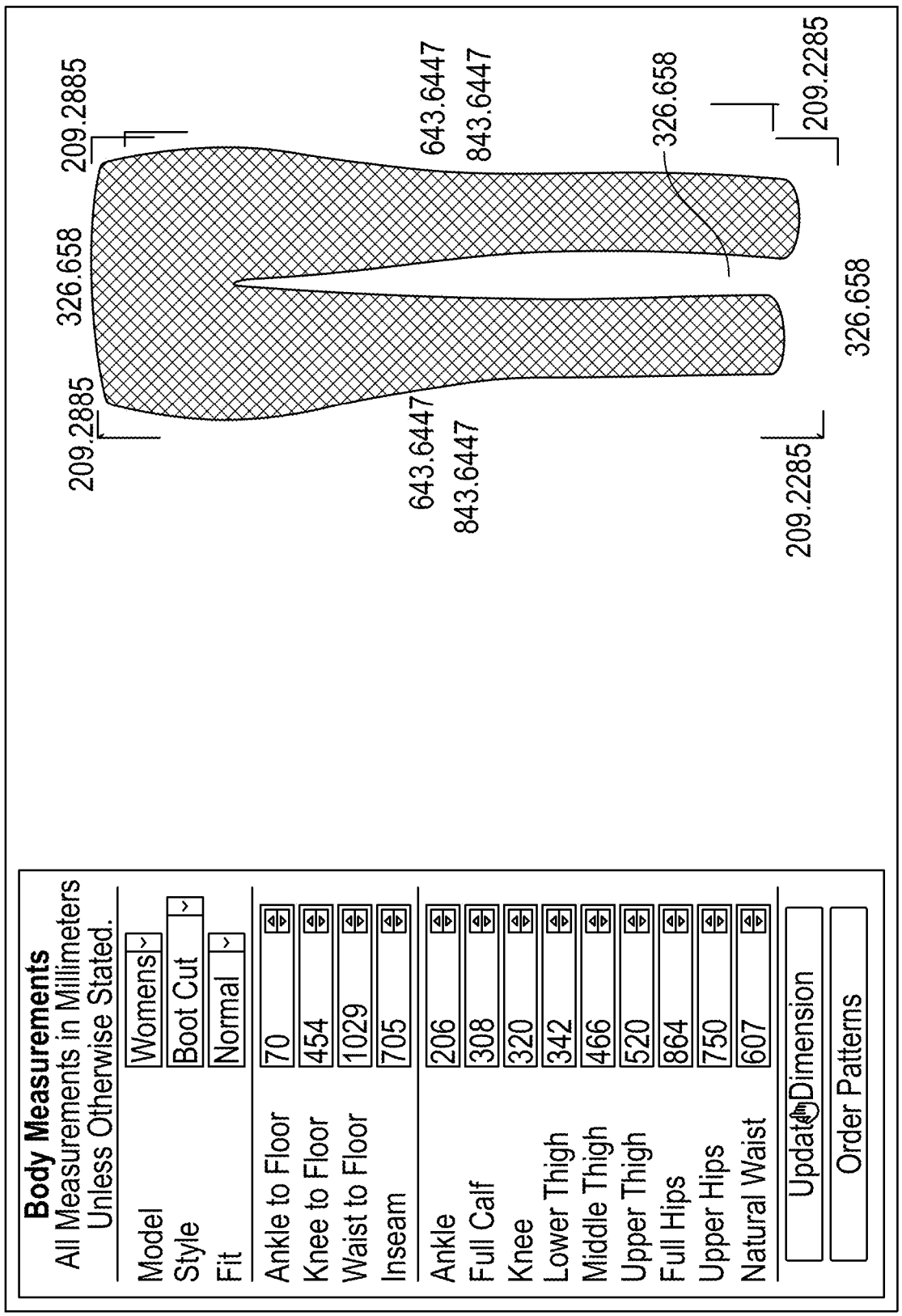
Figure 2D:
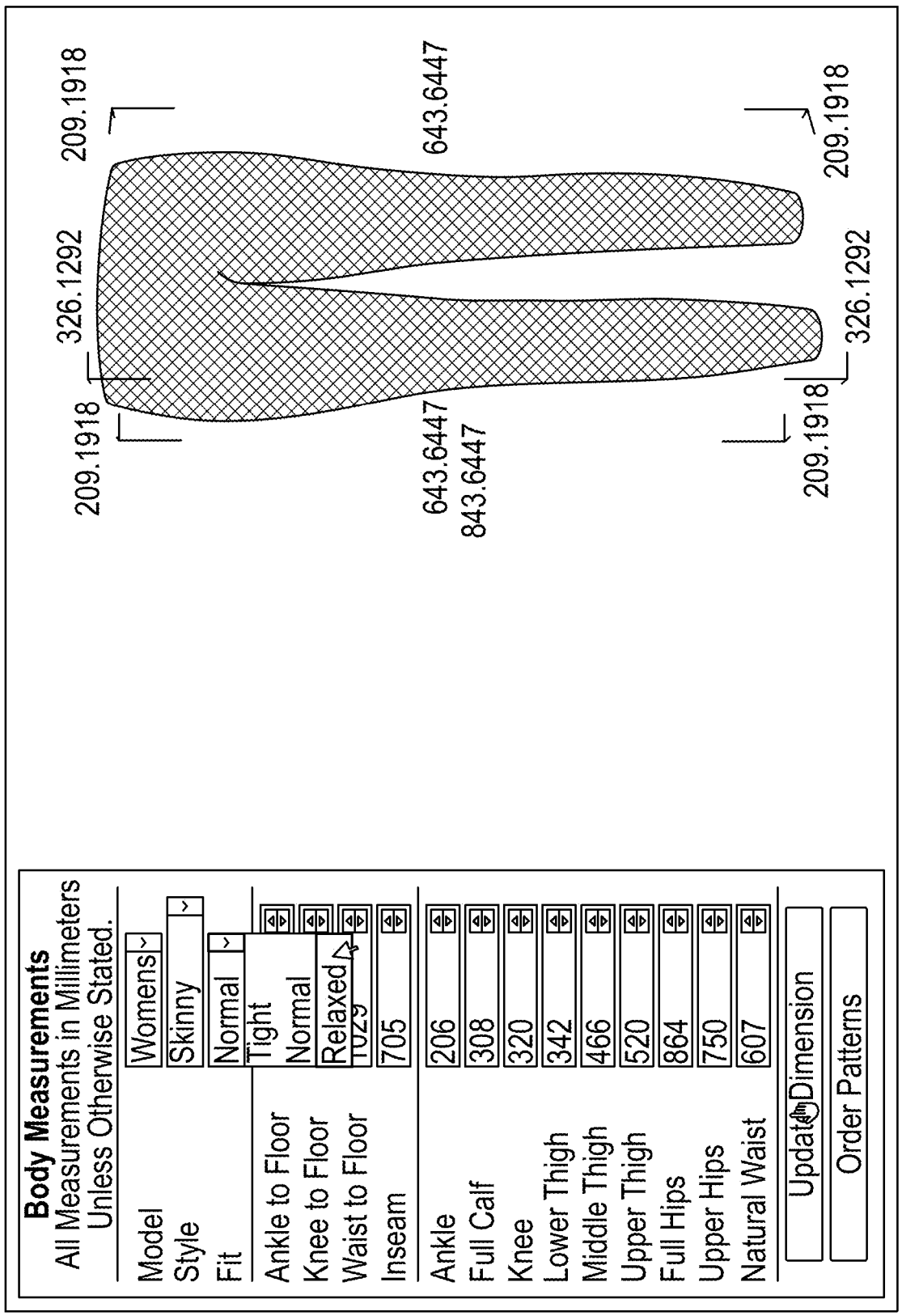

To illustrate different styles of pants using the same set of measurements, FIGS. 2A-2D are provided. FIG. 2A shows a 3D model for a skinny leg style pair of jeans and FIG. 2B shows a 3D model for a flared leg style pair of jeans. FIG. 2C shows a 3D model for a boot cut style of jeans and FIG. 2D shows a 3D model for yet another skinny style of jeans. It should be clear that these four 3D models for different styles of jeans were all generated using the same body measurements.

Figure 3A:
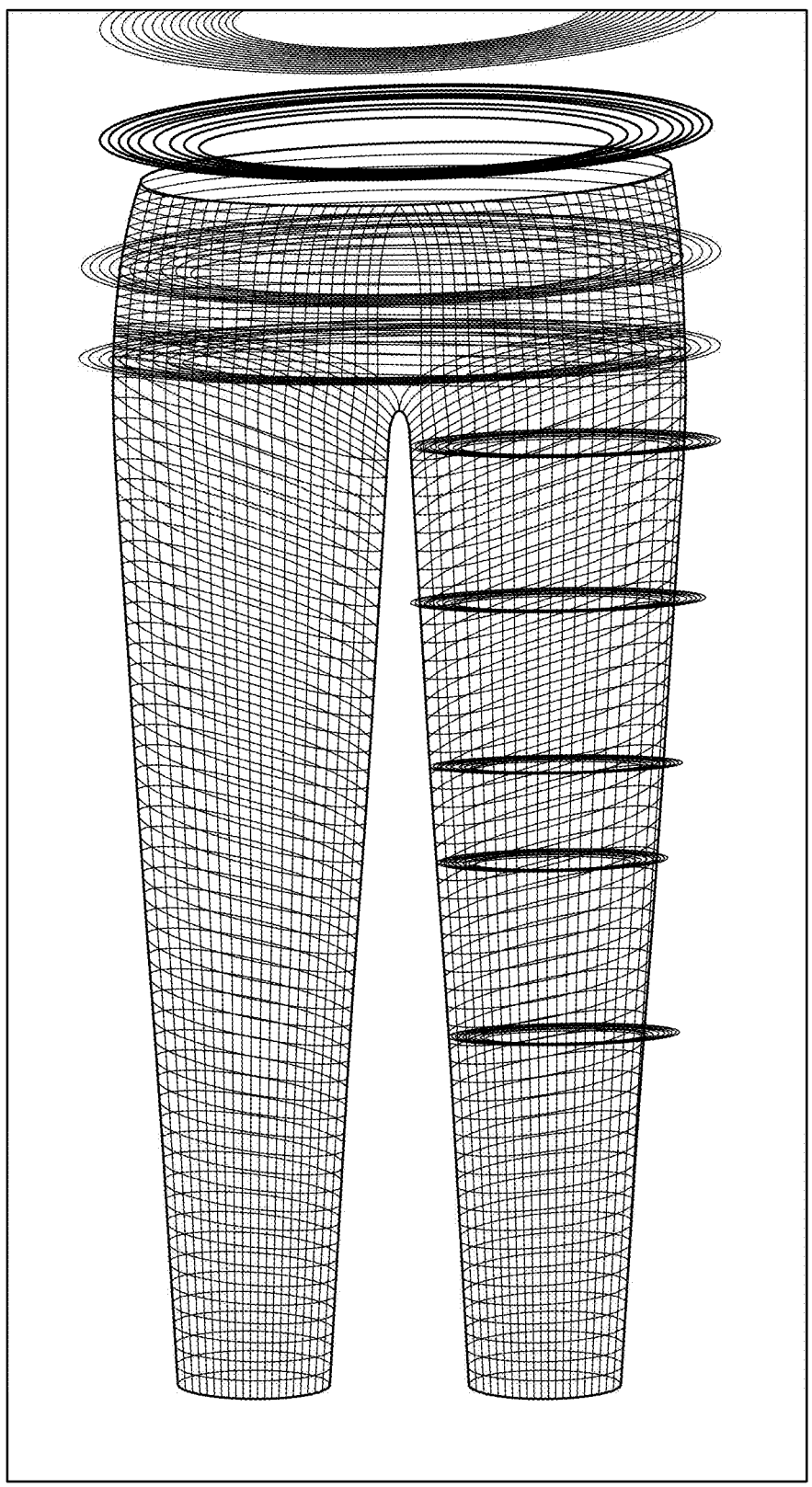
FIGS. 3A and 3B illustrate how various planar sections (in red) are connected to create a 3D model for a pair of pants.
Figure 3B:
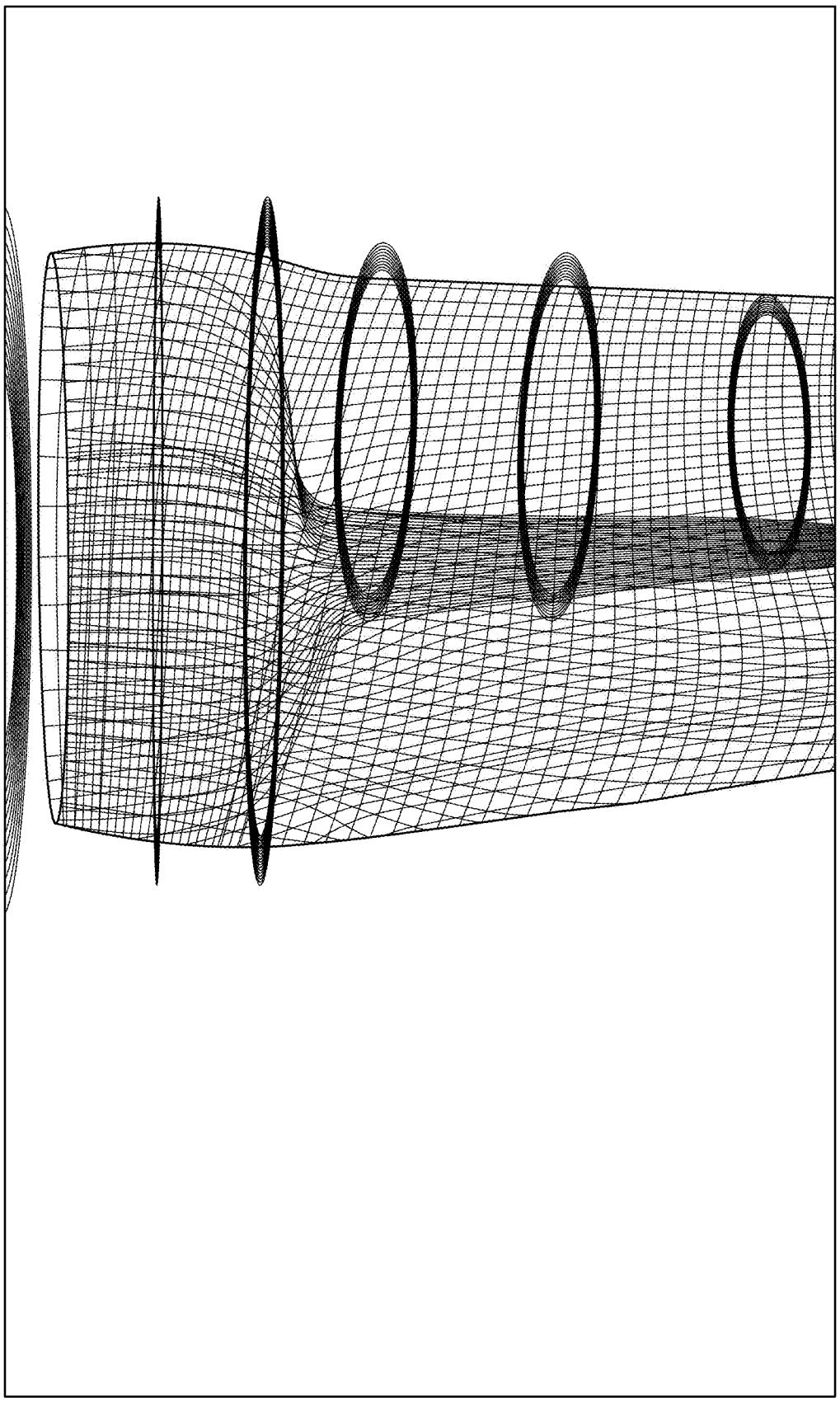

It should be clear that each 3D model is generated from the body measurements entered. This can be done by generating planar cross section curves of the piece of clothing with each section having the relevant measurement. Thus, a section for the knee section may be circular in shape (but not a true circle) with a circumference that has the measurement that was entered for the knee while the section for the ankle would be circular in shape with, again, the measurement entered for the ankle. For a differently shaped section such as the waist, an elliptical shape (but not necessarily a true ellipse) may be used with a circumference corresponding to the measurement entered for the waist/hip. These various planar cross section curves generated are then connected to one another to form the 3D model. As an example, an ankle section (a circular shape) may have a circumferential measurement of x inches while a knee section (another circular shape) would have a circumferential measurement of y inches. Each section is generated with the particular measurement and adjacent sections are then connected to one another. Connections between sections can be executed using well-known 3D modeling techniques such, for example, the LOFT technique or function. For pants legs, the adjacent sections can be connected by "lofting" the intervening areas. As an example, the volume between the planar section of the knee and the planar section of the calf is filled in using the LOFT technique. Referring to FIGS. 3A and 3B, illustrated are various planar cross section curves (in red) that have been connected to form at least a portion of the resulting 3D model for a pair of pants.

As can be seen, the 3D model is generated as a holistic single model from the body measurements entered. It should be clear that the 3D model is also generated while taking into account the user selected style and/or fit. Generating the 3D model with style in mind may involve adding or subtracting values to the measurements used for specific portions of the 3D model as dictated by the style. As an example, a straight leg style pants would have a simple straight section from the knee section to the ankle section of each leg. However, for a flared leg style pair of pants, the ankle section may have its parameters (e.g., its circumference) added to, thereby ensuring that the 3D model's measurement for the ankle section is greater than that for the knee section. Similarly, for a boot cut style, the leg would taper from a wider knee section to a narrower ankle or calf section.

For each style, pre-set relationships between specific sections may be preprogrammed to ensure that the resulting 3D model reflects the desired style. As an example, for a flare leg style pants, one relationship may be that the ankle or calf section has to be x % larger (in circumference) than the knee section as this would provide the desired flare effect. Similarly, for boot cut pair of pants, the relationship may be that the ankle section has to be y % smaller in circumference than the knee section to produce the desired tapering effect. These style-based relationships may be preprogrammed into the system and may be implemented automatically as the 3D model is generated. Of course, with the style requirements taken into account, the resulting 3D model may not have the exact measurements as entered by the user. The measurements of the 3D model are thus based on the user entered measurements with the relevant style and/or fit requirements taken into account.

It should be noted that the other style considerations may also be taken into account when generating the 3D model for the piece of clothing/garment. As an example, specific styles of pockets (and their attendant changes to the 3D model) may be applied. Thus, a straight but slanted pocket opening, or a straight vertical opening may be incorporated when generating the 3D model for a specific pants or jeans style. Depending on the pocket opening or on other style-based considerations, specific sections or areas of the 3D model may be removed/cut away.

When generating the 3D model, considerations for fit and/or ease of movement may also be taken into account. In terms of fit, preprogrammed additional percentages may be added to the specific measurements for the different parts of the 3D model to ensure that the desired fit for the clothing is achieved. The resulting measurements are then used to generate the 3D model. As an example, specific percentages of a measurement may be added or subtracted as called for by a specific desired fit. Thus, for a loose fit pair of jeans, an extra 5-10% may be added to the various sections of the leg (e.g., the thigh sections) and/or to the buttocks/saddle area (e.g., the full hip section or to the total rise measurement). Similarly, for a desired tight fit or a body hugging/body sculpting fit, a 5% decrease may be applied to the buttocks area (i.e., the full hip section) as well as to the thigh sections and the knee and ankle/calf sections. The reduction in measurements would ensure that the resulting garment would have the desired tight fit and/or have the desired body sculpting effect. Additionally, specific measurements in specific sections may be added to or subtracted from prior to generating the 3D model to allow for ease of movement for the user of the clothing. As an example, for dress shirts, an extra allowance of perhaps 5%-10% of a measurement may be applied to the arms sections to ensure that the wearer can actually move his or her arms comfortably while wearing the resulting shirt. As well, for the wrist section of a shirt, an extra 5% may be added to the measurement to ensure that shirt cuffs can be buttoned up with some ease. It should thus be clear that the measurements resulting from the original measurements entered by the user and changes to the measurements dictated by fit and/or style considerations are the measurements used in generating the 3D model. Thus, the 3D model generated reflects the user desired fit and style as well as the user's entered measurements.

In addition to the above, note that, instead of percentages, the amounts to add or remove to the measurements may be specific values based on ranges. Thus, as an example, if a wrist measurement is between 12 and 16 cm, an extra 1.25 cm is to be added to the wrist measurement/circumference. However, if the wrist measurement is less than 12 cm, only 0.9 cm is to be added. As will be understood by those of skill in the art, the fit adjustments can be preprogrammed and built into the system such that the necessary additions or subtractions are automatically applied to each relevant measurement prior to generating the 3D model. Fit adjustment algorithms, as well as any other automatic adjustment algorithms, may be style or fit customized and are applied automatically to the measurements as necessary prior to generating the 3D model. Thus, a set of tight fit adjustments may be applied to the measurements of the 3D model to ensure a tight fit but a series of ease of movement adjustments to other measurements may also be applied to ensure that, while the fit is the desired tight fit, the resulting garment is also usable.

As part of the style adjustments to the measurements used in generating the 3D model, sections of the 3D model may be adjusted to account for accessories required by the style/garment. These accessories or fixed features may include items such as the location and provision for buttons, pockets, belt loops, labels, auxiliary pockets (e.g., small pockets for pocket watches), zippers, button flies, ankle/calf zippers, side pockets, cargo style pockets, leather patches, and the like.

To account for fabrics to be used for the manufacture of the piece of clothing, the 3D model may be constructed with provision for the characteristics of the fabric to be used. The 3D generation process may thus take into account the real world characteristics of fabrics, and of stretchable material in general, to ensure that the resulting 3D model of the garment closely mimics the real world behaviour of the material. As an example, the modulus of elasticity of the fabric/material (Young's modulus) may be taken into account when generating the 3D model or when optimizing that 3D model. For fabric, this modulus of elasticity can be taken into account in the warp, weft, and in the bias direction to predict material deformation as the material is caused to stretch by changes in the measurements applied. In addition to the modulus of elasticity, the 3D generation process can also take into account the thickness of the material or fabric to be used when constructing the clothing or item of interest. Thus, generally, a thicker material would not be as stretchable as a thinner material and this can be reflected in the 3D model generated. As another example, the 3D generation process can apply a target strain (i.e., which way a fabric is being strained when worn) when generating the model. When the 2D model is generated, the strain is relaxed and the produces a pattern that, when implemented in fabric, produces a snug fit for the clothing. The various portions/sections of the 3D model can also have its primary/transverse fiber orientation defined prior to the generation of the 3D model. This allows the "skin" of the 3D model to stretch (or not stretch) based on the fiber orientation. By taking such parameters into consideration when generating the 3D model, the resulting 3D model produced can more realistically mimic the real world behaviour of fabrics and other stretchable materials. In some implementations, some of the parameters noted above may be configurable prior to the generation of the 3D model. Such configurable parameters would allow for control of how well the 3D model can (or cannot) mimic the behaviour of the material to be used in manufacturing the item of interest. Such configurable parameters may include the mechanical properties of the material/fiber, the fiber orientation for fiber based materials, and the target strain explained above.

It should be clear that, prior to finalizing the 3D model, the 3D model can be optimized using the various parameters involved in generating that model. As an example of such optimization, if a fabric to be used is stretchable, a parameter for the stretchability of the fabric may be incorporated into the 3D model (e.g., the modulus of elasticity explained above). As well, to account for this stretch factor, the 3D model may be constructed so that the stretch of the fabric is taken into consideration when the model is constructed/generated. This can be done by constructing the 3D model such that the surface is composed of interconnected polygons, with the vertices of the polygons being movable points and the sides of the polygons being capable of lengthening. Both vertices and sides would lengthen and move based on how other polygons/sides lengthen as the sizes/sections of the 3D model is adjusted with the measurements. The 3D model would have the polygons at their regular state and, as measurements are changed for fit and style, these changing measurements would cause the polygons to stretch, their vertices to move, and their sides to lengthen. This would mimic the stretchability of the fabric and, depending on the configuration of the system and of various parameters for the 3D model, the amount by which the polygons lengthen and by how much the vertices move may be controllable/limited by other parameters. These parameters may, of course, be adjustable based on the selected fabric for the clothing. Thus, for very stretchy fabric (such as elasticized denim or cotton for skinny jeans), the parameters would allow greater movement for the vertices and greater range of lengthening of the polygon sides. However, for fabric or material such as leather, the parameters would be set such that there is minimal movement of the vertices and minimal lengthening of the polygonal sides. In one implementation, the polygons may be triangles.

After the 3D model of the garment has been generated, complete with fit and style parameters included, the resulting 3D model can be partitioned before being converted into multiple 2D models. The partitioning of the 3D model can be based on the expected/desired patterns for the clothing. As an example, for a pair of pants, the partitioning may be into left/right parts and front/back portions. The left/right partition may be along the middle of the pants while the front/back partition may be along the sides of the pants. This partitioning may be preconfigured depending on the configuration of the system. For ease of use with existing processes for garment assembly and cloth cutting, it would be preferred that the 3D model be partitioned such that the resulting 2D models conform to expected pattern shapes for the garment.

With the 3D model partitioned, the surface of the 3D model is then "unrolled" or "peeled" to produce multiple 2D models. Each 2D model generated conforms to the partition lines on the 3D model. As noted above, it is preferable that these 2D models conform to expected pattern shapes for the garment/clothing to be manufactured. It should be clear that the surface of the 3D model can be converted into 2D models using any suitable means. However, it has been found that best results were achieved when the conversion process took into account the stretchability/lengthening of the polygons that make up the 3D model surface. By converting the surface of the 3D model into 2D models, the polygon vertices and the polygon sides may contract into their original positions/lengths on the 2D model.

It should be clear that the mesh of the 2D model has the same topology as the section of the 3D model from which the 2D model was derived. This allows for the optimizations noted above to be taken into account when creating the 2D model. As an example, a section of the 3D model that has the edges of its polygons stretched due to a user desired snug fit will have a corresponding 2D model whose polygons are now more relaxed or returned to its original configuration. In other words, the 2D model will have the vertices of its polygons configured so as to minimize the average energy density of the mesh of the 2D model. This is to mimic the behaviour of a stretchable fabric that has been allowed to relax. In this sense, both the 2D model and the 3D model mimic the behaviour of the material or fabric from which the clothing or item is to be manufactured from.

As noted above, preferably, each portion of the 3D model surface that has been converted into a 2D model that conforms to a 2D pattern that can be used to construct/assemble the garment. For the pants or jeans illustrated in the Figures, this means that there would be a front left and a front right pattern as well as a rear left and a rear right pattern. In addition, two top patterns are also generated for the waist area. Each of these patterns corresponds to a 2D model from a partitioned section of the adjusted 3D model. However, even after the 2D models have been generated/converted, these are not yet suitable for use in the manufacture of the garment. Allowances in the material have to be made for manufacturing needs such as seams, stitches, hems, and the like.

To provide for these allowances in the 2D models, the 2D models are adjusted to thereby expand the area of the model. This way, extra material is provided for at each of the edges of the resulting pattern, allowing for material to be available for seams, hems, and the like. Each 2D model is expanded by adding a set amount for each edge and then joining each edge to the adjoining edges. This provides the resulting 2D pattern that can be used to cut fabric. The cut fabric, with the suitable allowances for manufacturing/assembly needs, can then be assembled into the resulting piece of clothing.

Figure 4:
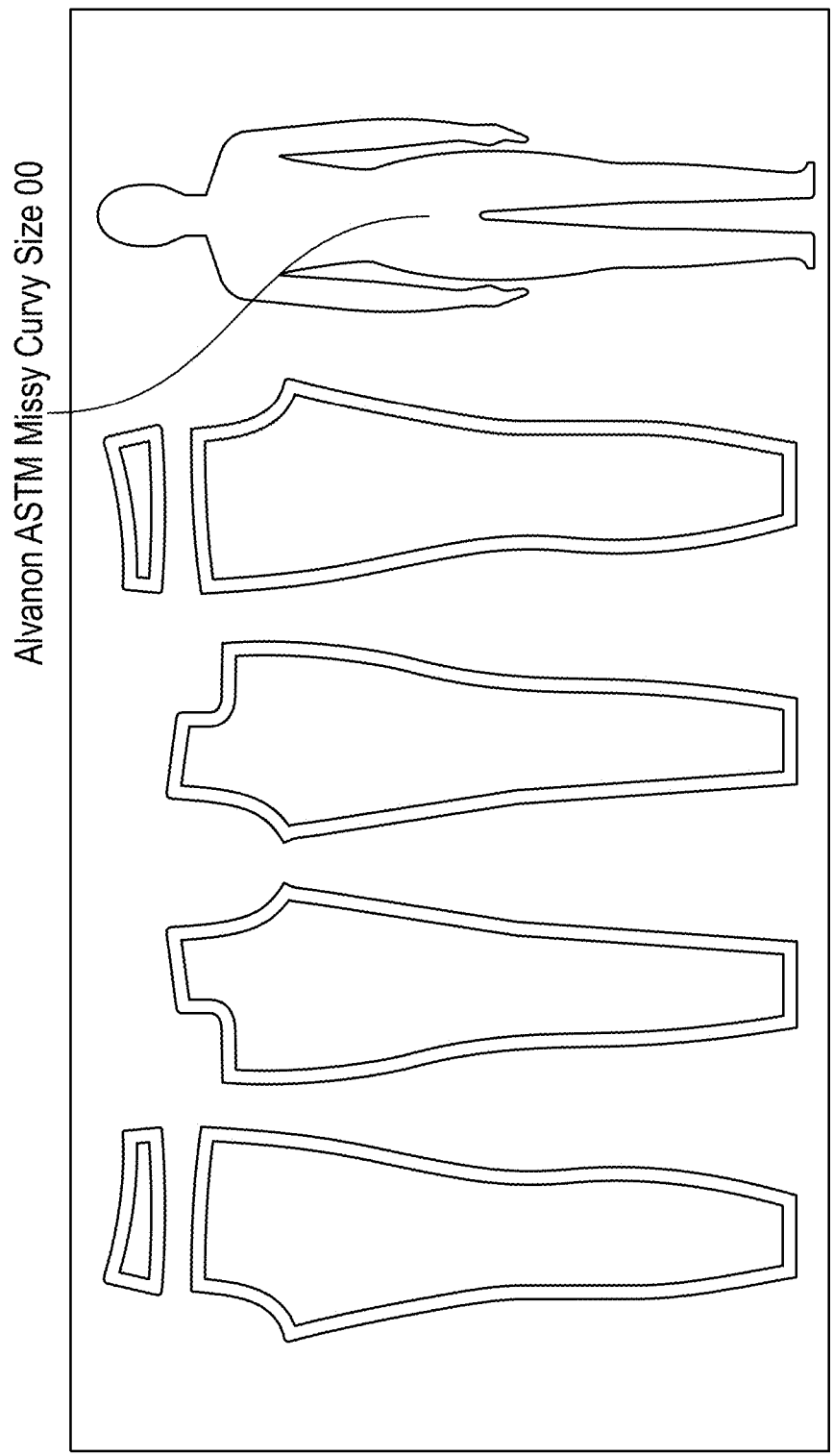
FIG. 4 illustrate the resulting 2D patterns for one style of pants.

Referring to FIG. 4, the resulting 2D patterns are illustrated for the skinny style size 00 jeans. These are the patterns generated from the 3D model illustrated in FIG. 2D. The actual 2D model is outlined in blue in the Figure while the actual pattern is outlined in red. The gap between the red outline and the blue outline is the allowance for the seams and/or stitching. It should be clear that, since the 3D model was partitioned along where the seams are going to be on the physical pants, the edges of the 2D models are where the seams will be. Thus, adding material for the stitching and the joined seams at the edges of all the 2D models to generate the patterns ensures that the additional material is well placed for these stitches and seams.

Figure 5:
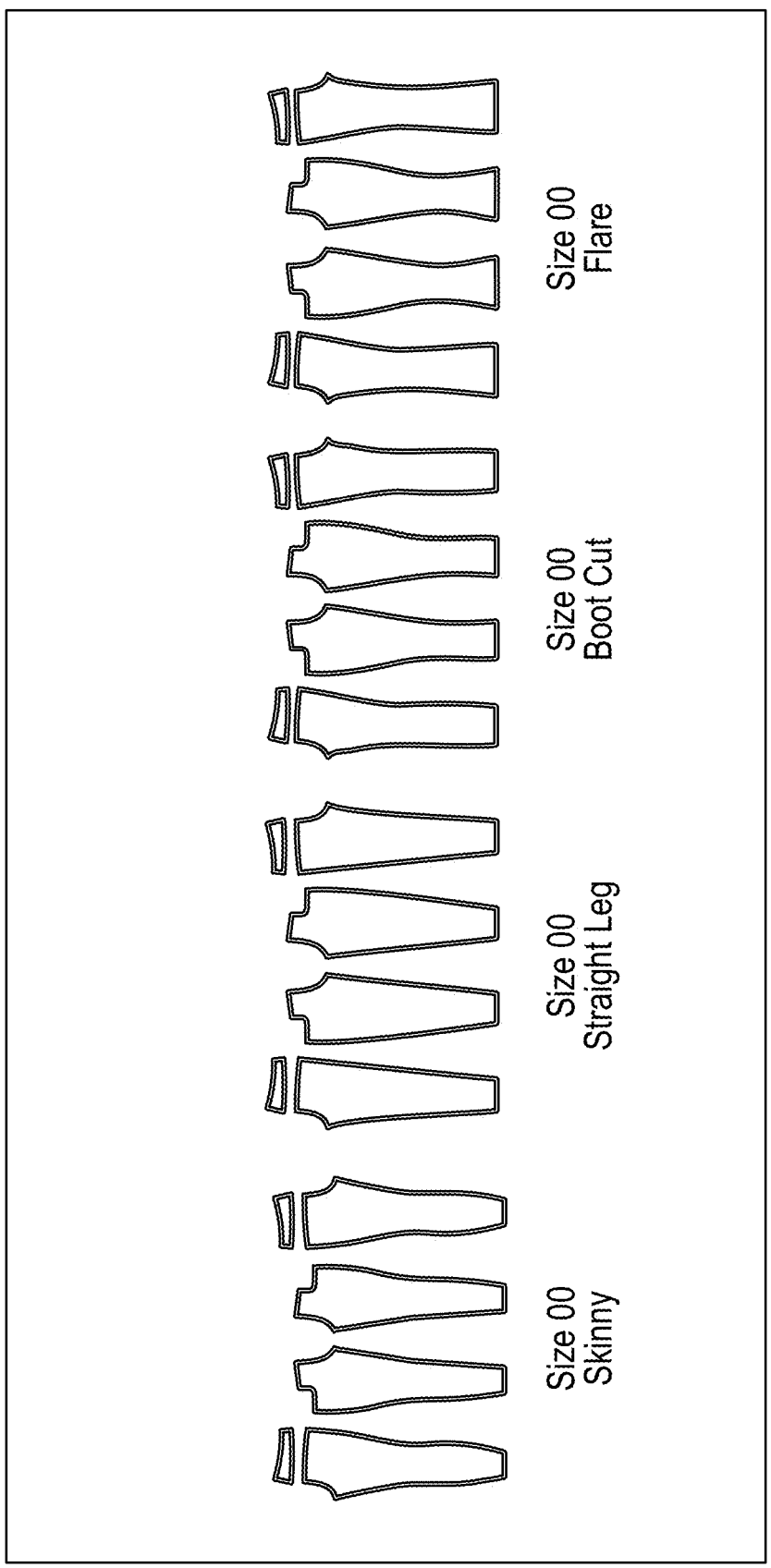
FIG. 5 show the various resulting 2D patterns from the 3D models shown in FIGS. 2A-2D.

For clarity, FIG. 5 illustrates the 2D patterns generated from the 3D models for the various styles of pants illustrated in FIGS. 2A to 2D.

It should be clear that the methods detailed above may be practiced using a dedicated system that operates to ingest user input to automatically produce patterns to be used in the manufacture of customized clothing. Such a system is detailed in the block diagram of FIG. 6. It should, of course, be clear that the system can also be used to produce patterns for the manufacture of many different items in many different fields.

Figure 6:
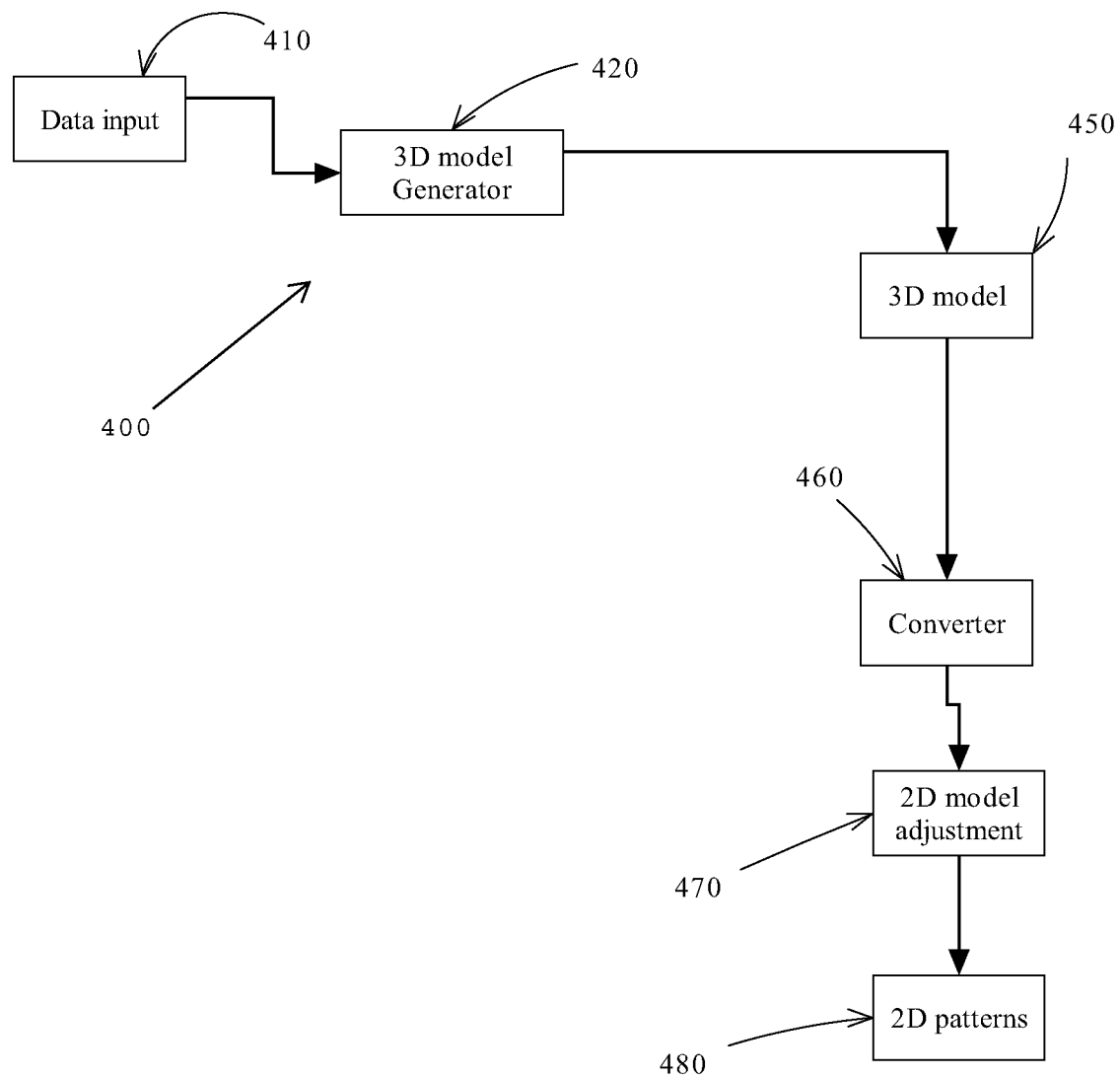
FIG. 6 is a block diagram of a system according to one aspect of the present invention.

Referring to FIG. 6, the system 400 includes a data input module 410, a 3D model generator module 420. This module produces the 3D model 450. The 3D model 450 can then be converted into suitable 2D models by the conversion module 460. The resulting 2D models produced can then be adjusted by the 2D model adjustment module 470 to result in the 2D patterns 480.

In operation, the data input module 410 receives user input that details the body measurements to be used on the clothing as well as the style, fit, and type of clothing for which 2D patterns are to be generated. Once all the data has been entered, the 3D model generator module 420 generates the 3D model for the clothing as described above. The generated 3D model 450 takes into account the different user selected options such as style and fit. Should the resulting 3D model 450 not be acceptable, different user inputs can then be received and the process re-run to produce a different 3D model 450. This process can be repeated until a suitable 3D model 450 is produced.

Once the 3D model has been produced, with suitable style and fit parameters being accounted for, the conversion module 460 converts the 3D model surface into suitable 2D models as explained above. The generated 2D models are then adjusted for manufacturing needs by the 2D model adjustment module 470 as explained above.

It should be clear that the system 400 may be implemented as a stand-alone system or as a cloud-based system with the various modules being implemented completely in software. The system may be implemented as a cloud-based solution with users logging into an online portal to thereby order custom fit clothing. Once the 2D patterns are made for the custom fit clothing, the patterns are sent to a manufacturer for production and the resulting garment is then sent to the user.

Figure 7:
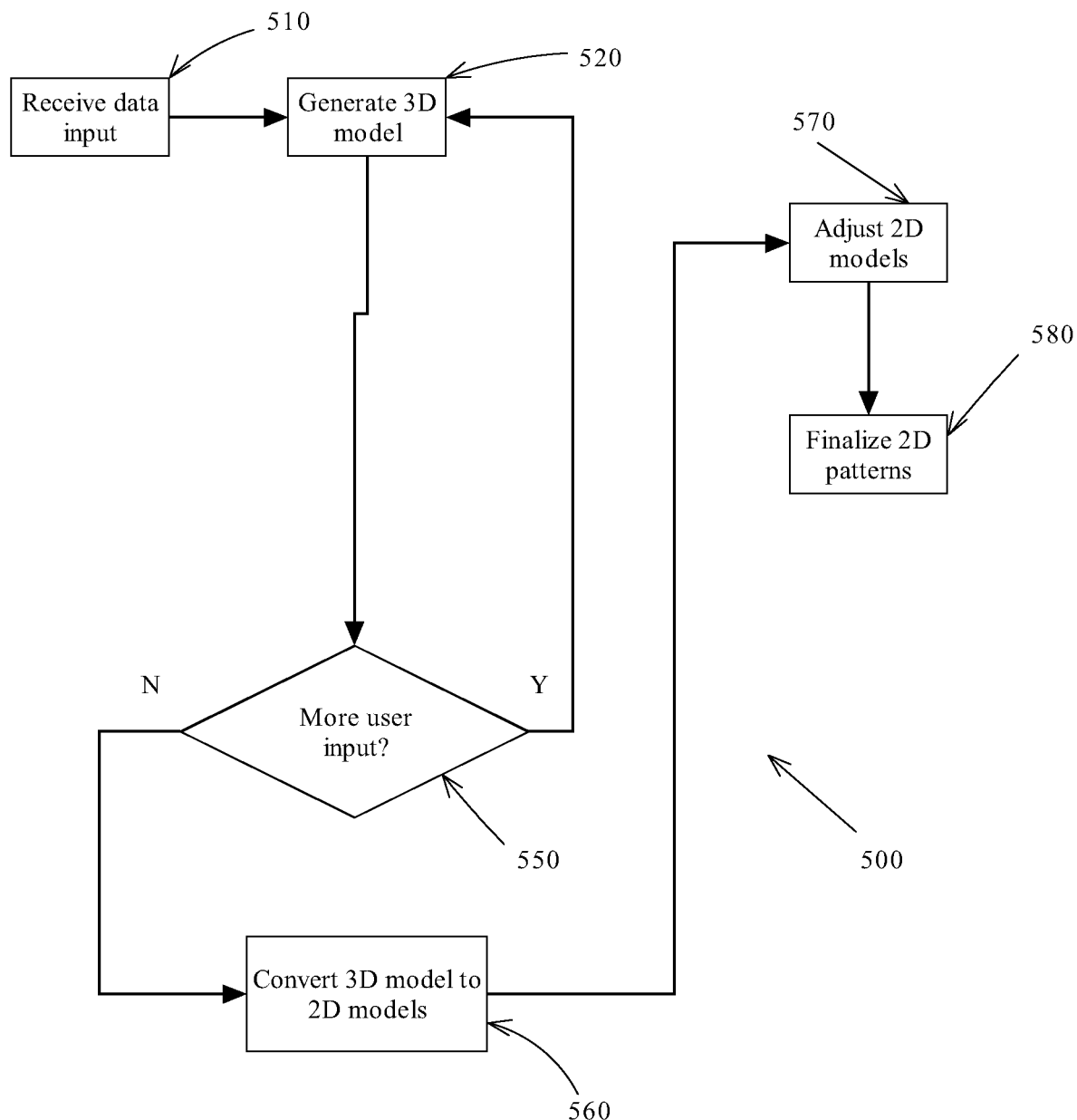
FIG. 7 is a flowchart illustrating the steps implemented by the system in FIG. 6.

The system in FIG. 6 implements a method as detailed in the flowchart of FIG. 7. The method 500 in FIG. 7 begins with the reception of user input data in step 510. Based on this data (including body measurements, type of clothing, fit, style, and may even include fabric), a 3D model is generated for the clothing (step 520). This generated 3D model already accounts for fit and style. Decision 550 determines if any user input is detected. If user input is detected, the method loops back to step 520 to generate a suitable new 3D model based on whatever was input by the user. Conversely, if no input was generated for the 3D model, the resulting 3D model is then converted into multiple 2D models (step 560). These 2D models are then adjusted for manufacturing needs (step 570) and are then finalized (step 580).

Figure 8:
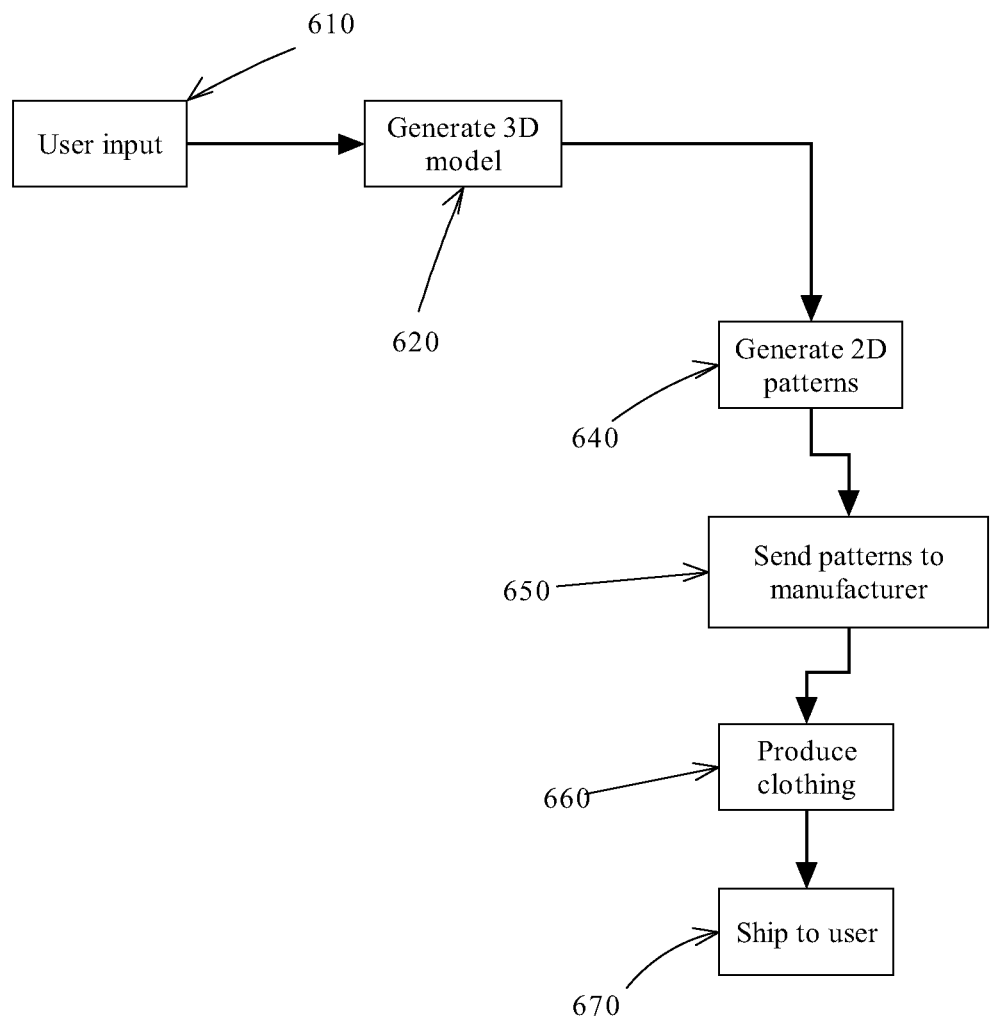
FIG. 8 is a flowchart detailing a method that incorporates the method illustrated in FIG. 7.

The system and method of the present invention may be incorporated into a larger method for producing customized clothing based on user input. This method is detailed in the flowchart of FIG. 8. The method begins at step 610, that of the user entering details about measurements and about the clothing to be custom manufactured. Based on the user input, a suitable 3D model is generated (step 620). The generated 3D model is based on the entered measurements as well as the user selected style and fit parameters. The generated 3D model is converted into multiple 2D models and patterns are created (step 640). Preferably, the 2D models correspond to expected shapes and patterns suitable for cutting fabric such that the cut fabric can be assembled into clothing. The final patterns are then sent to a manufacturer (step 650) and the clothing is produced (step 660). The clothing is then shipped to the customer (step 670). These steps can be performed in a fully automated process with minimal human intervention.

It should also be clear that the system and method of the present invention may be incorporated into an AI/Machine learning based system and methodology. In such a system, instead of a user entering body measurements and entering the type of clothing to be manufactured, an image of a piece of clothing or an image of a person wearing a piece of clothing can be entered into the system. The system can then, using image recognition as well as a suitably trained machine learning module with a library of clothing patterns and clothing types, determine what the item of clothing is. As an example, an image of a group of people can be entered into the system and the jacket of one of the people in the image can be highlighted. The system analyzes the image of the highlighted person and analyzes that the clothing is a jacket with a specific style and with specific accessories. The system then automatically selects JACKET as the type of clothing to be manufactured. The user can then approve the system determined type of clothing along with the system determined style of jacket. The fit can be entered by the user or, similarly, it can be determined automatically by the system and presented to the user for approval.

Regarding body measurements, the system can either receive a user's body measurements or the system can receive input from scanned body measurements. Similarly, one or more suitably arranged images of the user, perhaps with markers or scales in the background, can be used by the image to estimate the user's measurements. Front, side, and back images of the user, with suitable markers in the background, would allow the system to estimate the user's body measurements such as arm length, leg length, waist measurements, and the like.

Once the body measurements have been obtained, whether through user input or automatically using images or scanning, these are then used in conjunction with the system determined type of clothing (and style) to be manufactured. These system generated pieces of data can then be used with the system and method of the present invention to produce patterns for the desired garment.

It should also be clear that the system and the method of the present invention can be adjusted and adapted to produce patterns for any three-dimensional object that can be assembled/manufactured from 2D materials. Thus, leather goods, cloth-based goods, even metal sheet-based goods can be manufactured using patterns generated by the method and system of the present invention. As examples, the process, method, and system of the present invention can be used in the manufacture of items such as clothing, shoes, handbags, tents, fabric chairs, sheet metal based products, wood based products, or any other item of manufacture that uses patterns to cut material that can be assembled into a final product. By simply generating a 3D model of the desired end product and then using the surface of that 3D model to generate the patterns useful in manufacturing the end product, the manufacturing process for that end product has been greatly simplified.

As an added benefit, the present invention may be used for easy scaling up or down of patterns for use in the manufacturing of products. Currently, scaling up or down of patterns is done by linearly scaling the patterns used. This produces less than desirable results as the resulting items may not fit properly and these patterns may not even fit properly with one another. In the present invention, scaling up or down of a pattern is accomplished by scaling the 3D model. The scaled 3D model is then converted into the 2D models noted above and the patterns are made from the 2D models. By scaling the 3D model, the change in size mimics real world scaling and ensures that the patterns produced not only fit together but also fit well.

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a computer processor or similar device programmed in the manner of method steps or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A method for generating 2D patterns for use in clothing manufacturing, the method comprising:
   (a) receiving body measurements of a specific person, said specific body measurements being specific to a piece of clothing of interest;
   (b) receiving a desired style for said piece of clothing of interest;
   (c) generating a 3D model for said piece of clothing, said 3D model being generated by:

(c.1) generating a plurality of planar cross section curves based on said measurements received in step (a) and based on said desired style received in step (b), wherein each curve of said plurality of planar cross section curves corresponds to a region of said piece of clothing;

(c.2) connecting a first curve of said plurality of planar cross section curves to a second curve of said plurality of planar cross section curves, wherein said first curve corresponds to a first region of said piece of clothing, said second curve corresponds to a second region of said piece of clothing, and said first region is adjacent to said second region; and (c.3) repeating step (c.2) until each of said plurality of planar cross section curves is connected to at least one other of said plurality of planar cross section curves, such that said plurality of planar cross section curves connected together forms said 3D model;

(d) converting said 3D model into separate 2D models, each 2D model corresponding to a section of said 3D model and to a pattern for use in manufacturing said piece of clothing;

(e) adjusting each of said 2D models to account for manufacturing needs; and (f) finalizing each of said 2D models to result in 2D patterns suitable for clothing manufacture of said piece of clothing.

2. The method according to claim 1, wherein said 3D model comprises a plurality of interconnected polygons to form a surface of said 3D model.

3. The method according to claim 2, wherein said polygons are stretchable to thereby mimic characteristics of a fabric for use in manufacturing said piece of clothing.

4. The method according to claim 1, wherein a desired fit is received in step (b) and wherein said 3D model is generated in step (c) further based on said desired fit.

5. The method according to claim 4, further comprising adjusting said measurements are adjusted to allow for a projected movement of a person wearing said piece of clothing, based on said desired fit, wherein an adjustment to said measurements comprises either of: a reduction of at least one of said measurements or an addition to at least one of said measurements.

6. The method according to claim 1, further comprising sectioning said 3D model into sections, each section corresponding to a panel of cloth that would be cut and assembled into said piece of clothing.

7. The method according to claim 1, wherein said 3D model is preconfigured to account for fixed features of said piece of clothing.

8. The method according to claim 1, wherein step (f) comprises at least one of:
adding to dimensions of each of said 2D models to account for seams to be used in manufacturing said piece of clothing; and
adding to dimensions of each of said 2D models to account for specific types of stitches to be used in manufacturing said piece of clothing.

9. A method for generating 2D patterns for use in manufacturing, the method comprising:
(a) receiving item measurements relating to an item of manufacture that is of interest;
(b) generating a 3D model for said item of manufacture, said 3D model being generated by:
(b.1) generating a plurality of planar cross section curves based on said measurements received in step (a), wherein each curve of said plurality of planar cross section curves corresponds to a region of said piece of clothing;

(b.2) connecting a first curve of said plurality of planar cross section curves to a second curve of said plurality of planar cross section curves, wherein said first curve corresponds to a first region of said piece of clothing, said second curve corresponds to a second region of said piece of clothing, and said first region is adjacent to said second region; and (b.3) repeating step (b.2) until each of said plurality of planar cross section curves is connected to at least one other of said plurality of planar cross section curves, such that said plurality of planar cross section curves connected together forms said 3D model;

(c) converting said 3D model into separate 2D models, each 2D model corresponding to a section of said 3D model and to a pattern for use in manufacturing said item;

(d) adjusting each of said 2D models to account for manufacturing needs; and (e) finalizing each of said 2D models to result in 2D patterns suitable for manufacturing of said item.

10. The method according to claim 9, further comprising a step of receiving user selected options for said item of manufacture and wherein said 3D model generated is based on said user selected options.

11. The method according to claim 10, wherein user selection options include at least one of: style and fit.

12. The method according to claim 11, wherein each user selectable style for said item of manufacture has corresponding parameters that are applied to said 3D model when said 3D model is being generated, said corresponding parameters, when applied, adds or subtracts to measurements used to generate said 3D model.

13. The method according to claim 11, wherein steps (b) to (e) are fully automated.

14. A system for generating 2D patterns for use in manufacturing, the system comprising processing circuitry configured to:
generate a 3D model of an item of manufacture, said 3D model being based on user-provided measurements and being generated by:
generating a plurality of planar cross section curves based on said user-provided measurements, wherein each curve of said plurality of planar cross section curves corresponds to a region of said piece of clothing;
connecting a first curve of said plurality of planar cross section curves to a second curve of said plurality of planar cross section curves, wherein said first curve corresponds to a first region of said piece of clothing, said second curve corresponds to a second region of said piece of clothing, and said first region is adjacent to said second region; and
repeating said connecting until each of said plurality of planar cross section curves is connected to at least one other of said plurality of planar cross section curves, such that said plurality of planar cross section curves connected together forms said 3D model;
converting surfaces of said 3D model into at least one 2D model; and
adjusting each of said at least one 2D model into a pattern suitable for manufacturing said item of manufacture.

15. The system according to claim 14, wherein said 3D model is further based on user selected options.

16. The system according to claim 15, wherein said item of manufacture is a piece of clothing.

17. The system according to claim 16, wherein said measurements for said clothing are body measurements.

18. The system according to claim 17, wherein said body measurements are generated by said system from at least one image of a user who will wear said piece of clothing.

19. The system according to claim 16, wherein a type of said piece of clothing is determined by said system from at least one image of said piece of clothing.

* * * * *